US007024274B2

(12) United States Patent
Johansson

(10) Patent No.: US 7,024,274 B2
(45) Date of Patent: Apr. 4, 2006

(54) METHOD FOR HANDLING STACKABLE STORAGE OBJECTS

(76) Inventor: Björn Johansson, Lindfjäll 8399 439 91, Onsala (SE)

(*) Notice: Subject to any disclaimer, the term of this patent is extended or adjusted under 35 U.S.C. 154(b) by 0 days.

(21) Appl. No.: 09/872,481

(22) Filed: Jun. 2, 2001

(65) Prior Publication Data

US 2002/0019681 A1 Feb. 14, 2002

Related U.S. Application Data

(63) Continuation of application No. PCT/SE99/02239, filed on Dec. 1, 1999.

(30) Foreign Application Priority Data

Dec. 3, 1998 (SE) .................................... 9804186

(51) Int. Cl.
*G06F 7/00* (2006.01)

(52) U.S. Cl. ...................... 700/226; 700/224; 700/225; 700/226; 700/218; 209/584

(58) Field of Classification Search ................ 700/223, 700/224, 225, 226, 218; 209/584; 414/278, 414/792.9, 793
See application file for complete search history.

(56) References Cited

U.S. PATENT DOCUMENTS 4,388,994 A * 6/1983 Suda et al. ................. 209/564
4,692,876 A * 9/1987 Tenma et al. ............... 364/513
4,992,649 A * 2/1991 Mampe et al. .............. 235/462

(Continued)

FOREIGN PATENT DOCUMENTS

DE 2344861 A1 3/1975

(Continued)

*Primary Examiner*—Donald P. Walsh
*Assistant Examiner*—Michael E Butler
(74) *Attorney, Agent, or Firm*—Novak Druce & Quigg, LLP

(57) ABSTRACT

A method for sorting and stacking stackable storage objects where the storage objects consist of at least three stacks. The method includes the steps of identifying and marking each storage object with a sequence number for each object in a withdrawal order. Identifying the lowest unmarked storage object above a mark storage object in each stack. Categorizing the stack containing the identified lowest unmarked storage object as a first stack and categorizing each remaining stack as a second stack. Moving each storage object from the first stack onto one or more of the second stacks until the identified lowest unmarked storage object is on top of the first stack. Sorting and moving all of the marked storage objects from the second stacks onto the first stack. Moving each of the storage objects in the arrival stack to one or more second stacks. Moving each of the marked storage objects to the second stacks from the first stack. Terminating the method when each of the marked storage objects in each of the second stacks has a lower sequential number than the marked storage object below the marked storage object in a second stack. Rearranging the order of the marked storage objects in the first stack and repeating the steps of moving each of the marked storage objects to the second stacks from the first stack and rearranging the order of the marked storage objects in the first stack until each of the marked storage objects in each of the second stacks has a lower sequential number than the marked storage object below the marked storage object in a second stack.

6 Claims, 15 Drawing Sheets

U.S. PATENT DOCUMENTS

| | | | | |
|---|---|---|---|---|
| 5,097,960 | A * | 3/1992 | Tilles et al. | 209/584 |
| 5,119,954 | A * | 6/1992 | Svyatsky et al. | 209/584 |
| 5,158,183 | A * | 10/1992 | Beerman et al. | 209/546 |
| 5,238,350 | A * | 8/1993 | Krieg et al. | 414/278 |
| 5,421,464 | A * | 6/1995 | Gilmann | 209/584 |
| 5,799,800 | A * | 9/1998 | Lux | 209/554 |
| 6,185,479 | B1 * | 2/2001 | Cirrone | 700/216 |
| 6,303,889 | B1 * | 10/2001 | Hayduchok et al. | 209/584 |
| 6,749,194 | B1 * | 6/2004 | Hanson et al. | 271/176 |

FOREIGN PATENT DOCUMENTS

| | | |
|---|---|---|
| DE | 3313368 C2 | 8/1985 |
| GB | 2265893 A | 10/1993 |

* cited by examiner

METHOD FOR HANDLING STACKABLE STORAGE OBJECTS

CROSS REFERENCE TO RELATED APPLICATIONS

The present application is a continuance of PCT Application No. PCT/SE99/02239, filed on Dec. 1, 1999, which claims priority to Swedish Patent Application No. 9804186-6, filed on Dec. 3, 1998.

BACKGROUND OF THE INVENTION

1. Technical Field

The present invention relates to a method for handling stackable storage objects. More particularly, the present invention is for a method for handling stackable storage objects using a collector.

2. Background of the Invention

In storage handling of metal sheets it is customary, according to known techniques, to use a so-called level store wherein metal sheets are stored on pallets. The store has a number of shelves or compartments arranged laterally and vertically. Here, sheets of a certain type and size, normally identified by a specific article number, are stored on a pallet. Sheets with different article numbers are not normally stored on the same pallet. The actual storage handling in a level store of this type is normally carried out using trucks or forklifts. A problem with such a level store is that it requires large storage surfaces in the storage premises, partly because each shelf position or compartment is only intended to accommodate sheets of the same article number and partly because the trucks require a relatively large maneuvering space around the storage shelves. In addition, the operating costs for the trucks are not insignificant, irrespective of whether the trucks used are driver-operated or driverless. In brief, a level store with truck operation entails relatively high storage costs.

In smaller plants, it is customary for different types of sheets to be stored vertically in stands in which the sheets lean against vertical support pins. Since the sheets are usually transported and delivered to the plant in a horizontal position, they have to be lifted by the warehouse personnel on arrival. This manual handling presents handling difficulties and accident risks, since the sheets are often heavy and difficult to grip. In addition, the sheets generally have to be laid down horizontally again before leaving the store.

SUMMARY OF THE INVENTION

The present invention solves the above problems by providing a method for handling stackable storage objects. The present invention can advantageously be used in a store or warehouse, for example, a central warehouse of a metal sheet user or the collection depot of a steel wholesaler. Alternatively, the invention can be applied advantageously in production stores or manufacturing plants in direct connection with one or more processing machines. Particularly, the present invention provides a cost-effective handling method for stackable objects, such as metal sheets or plywood, requiring a small surface area in relation to previously known storage handling methods.

According to the present invention, storage area can be made particularly compact by virtue of the fact that storage objects with different article numbers can be stored in the same storage stack. In addition, the invention eliminates the need for extensive shelf systems and pallets since the storage objects can be placed directly of the floor surface of the storage area. In this way, the weight of the storage stacks is also distributed over a greater area of the floor, which is beneficial if there are any limitations in the load-bearing capacity of the floor.

The method of the present invention is largely automated and is controlled by a control unit having a processor which, via a communications link, controls a collector device in accordance with instructions from a user. When a withdrawal order relating to a certain article number or a series of different article numbers is obtained, the desired storage objects are rapidly and effectively sorted out in the desired order of use.

A further advantage of the present invention is that the handling method requires very limited supervision and involvement by the user, since the sorting in the storage area is automatic using the method of the present invention.

BRIEF DESCRIPTION OF THE DRAWINGS

The invention will be described below on the basis of an illustrative embodiment and with reference to the attached drawings, in which.

DESCRIPTION OF PREFERRED EMBODIMENT

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
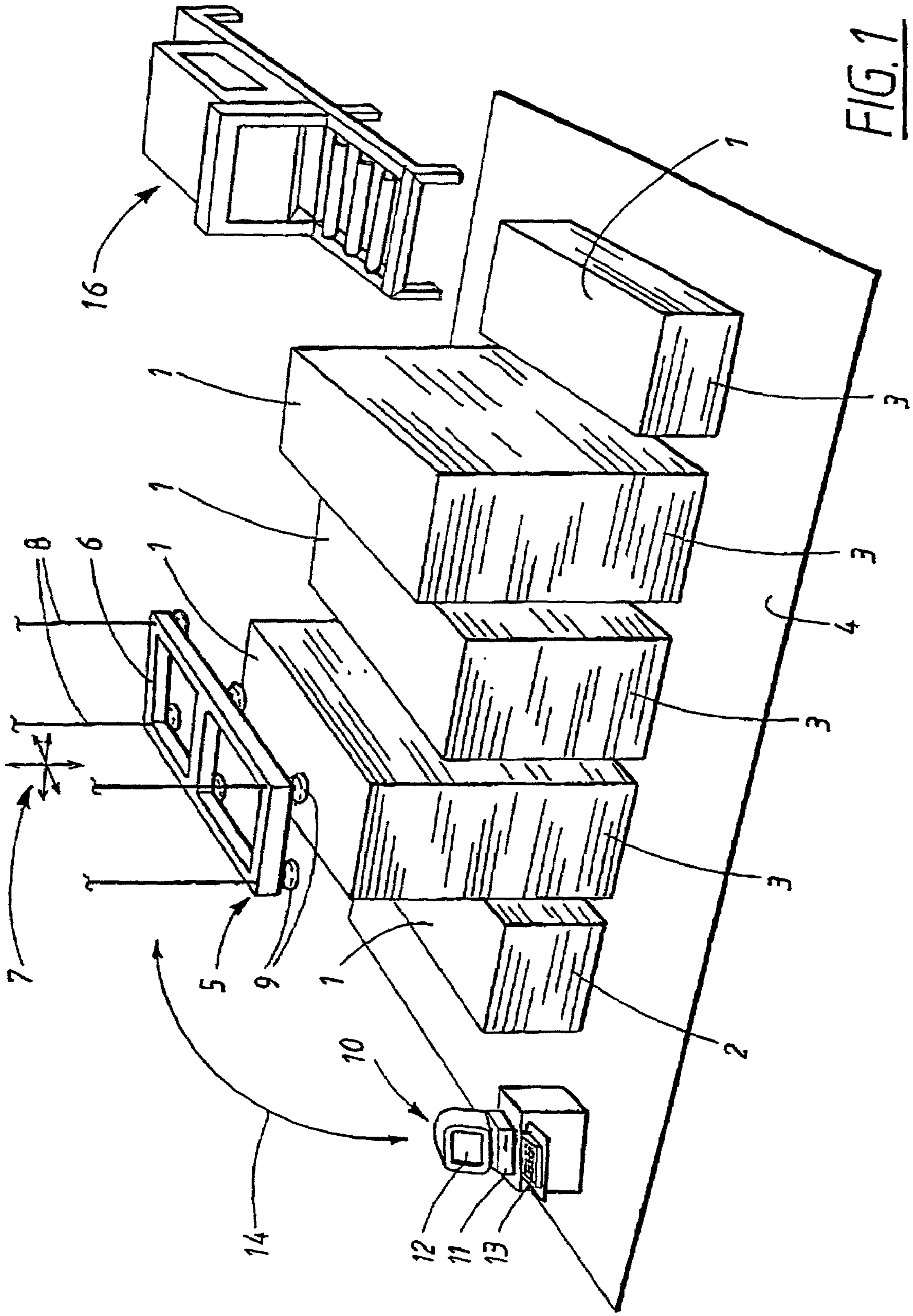
FIG. 1 is a perspective view of the handling system according to an embodiment of the present invention.

Referring to FIG. 1, a diagrammatic representation of a store or warehouse containing storage objects in the form of metal sheets is illustrated. The storage objects are generally designated by reference number 1. The store or warehouse contains an arrival stack 2 and four storage stacks 3. However, only three stacks are needed to implement the handling method of the present invention. Still, the number of sorting steps increases with a minimum number of storage stacks. Four storage stacks are used in the embodiment in order to illustrate the method of the present invention. It can also be seen from FIG. 1 that the storage stacks 3 and the arrival stack 2 are placed directly on a store floor 4. Thus, the method according to the present invention does not require the use of loading pallets or lateral guides in the form of boundary walls, rails etc. The storage stacks 3 can advantageously be placed in close proximity to each other in such a way that the available floor space in the store is utilized effectively.

The storage objects 1 are moved between the said arrival stack 2 and the storage stacks 3 by means of a collector 5 consisting of a lifting frame 6 which is movably connected to a crossbar arrangement (not shown) suspended over the store area. The collector 5 can be raised and lowered and can also be moved in the horizontal plane according to the arrows 7. As illustrated, the collector 5 is suspended on cables 8 which, are not shown in full since the crossbar pieces of the collector 5 are not shown. The collector 5 is provided with means for securing and releasing the storage objects 1. These means may be in the form of suction cups 9 that hold the storage objects 1 by a vacuum generated in a known manner such as ejectors driven by compressed air. In another embodiment, the collector 5 may be equipped with holder members provided with electromagnets. Still further, in the case where the storage objects 1 consist of, for example, trays with retail contents, the collector 5 may be equipped with traditional gripping members that physically grip onto coupling members on the tray.

A storage system applying the method according to the present invention also includes a control unit 10 having a processor. The control unit 10 preferably consists of a generally available personal computer or computer work station of a conventional type. The control unit 10 thus comprises a systems unit 11 and a user interface connected thereto such as a computer screen 12 and a keyboard 13. The control unit 10 controls the movements of the collector 5 in accordance with instructions from a user, which are input to the control unit via the said user interface 12, 13. The control unit 10 is in contact with the collector 5 via a communications link 14 illustrated in FIG. 1 by a two-way arrow.

A processing station 16 placed outside the storage floor area 4 is also illustrated in FIG. 1. In the example shown, the processing station 16 represents the final destination of those storage objects delivered from the store or warehouse. However, depending on the store's use, the processing station 16 can instead consist of a dispatch point or a goods vehicle for transporting and delivering the storage objects to the actual end-user.

When storage objects 1 arrive in the arrival stack 2, the control unit 10 is fed with information regarding the individual identity of each storage object, the type of storage object 1 and the position of the storage object 1 in the arrival stack 2. The instructions include withdrawal orders arranged in a withdrawal list in the control unit. The withdrawal orders are arranged in the withdrawal list in the desired sequence and each withdrawal order represents a storage object 1 of a certain type. The term "type" used here is a collective term for storage objects having identical dimensions, for example. Storage objects of a specific type are normally assigned a special article number, which thus identifies the type. The term "desired sequence" includes both the situation where storage objects with the desired article number are arranged in a desired sequence, and the situation where the sequence is determined by the times at which different storage objects have been requested by the user. In the latter case, earlier withdrawal orders are executed before later withdrawal orders.

Figure 2:
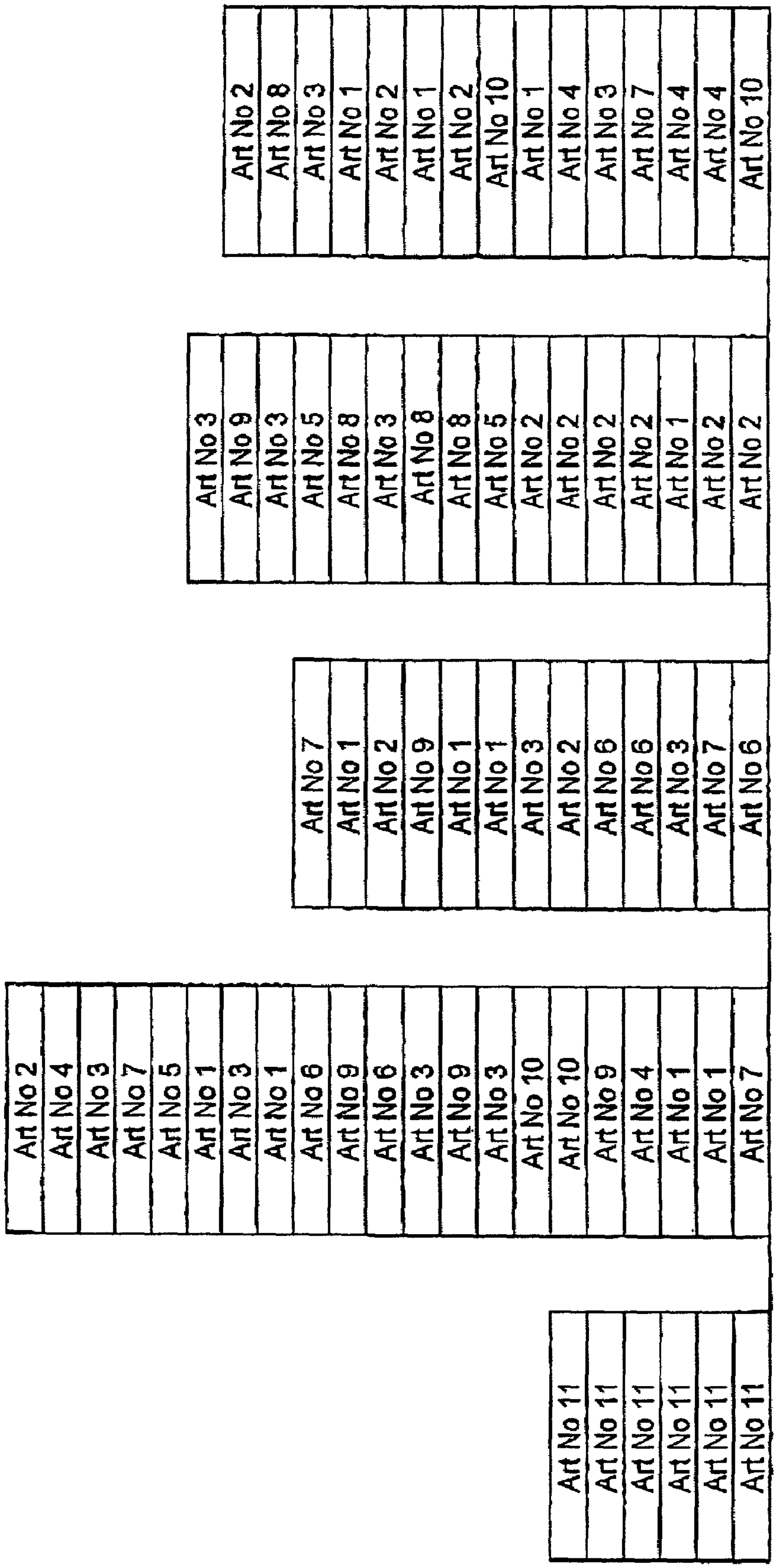
FIG. 2 is an illustration of the storage objects representing a randomly selected starting point according to one embodiment of the present invention.

The method for storage handling according to an embodiment of the present invention is described in more detail with reference to FIGS. 2–10. FIG. 2 illustrates a randomly selected starting point for the method, where storage objects 1 have been provided with eleven different article numbers. The arrival stack 2 is found on the far left, while the other four stacks are storage stacks 3.

In this starting position of FIG. 2, the storage objects 1 are lying unsorted in the storage stacks 3 and the arrival stack 2 has just been filled with six storage objects of article number 11. Those storage objects delivered to the store are first placed on the arrival stack 2. The user enters information on the individual identity of each storage object, its type and its position in the arrival stack 2. The term individual identity can cover a number of parameters, such as the length, width, thickness, weight, quality, supplier, surface treatment, project allocation, charge on batch number, price and arrival date of the storage object 1. In a preferred embodiment, the collector 5 comprises a means for identifying the storage objects 1, for example, in the form of an arrangement for weighing the storage objects. This means that the collector 5 emits signals to the control unit 10 concerning the weight of the secured storage object. In the context of the handling of metal sheets, this is often a clear identifier of the type of sheet, since the sheet dimensions and density are previously known and recorded under the given article number in the control unit 10. In other applications where storage objects of other types are used, the collector 5 can be equipped, for example, with bar-code scanners or other optical scanning means. Scanning means of a electronic type scanning means such as microchip marking of the storage objects can, of course, also be used.

The following is an exemplary withdrawal list for illustrating the method according to the present invention:

Sequence number 1 Art No 2
Sequence number 2 Art No 7
Sequence number 3 Art No 9
Sequence number 4 Art No 3
Sequence number 5 Art No 8
Sequence number 6 Art No 7
Sequence number 7 Art No 10
Sequence number 8 Art No 1
Sequence number 9 Art No 6
Sequence number 10 Art No 5
Sequence number 11 Art No 5
Sequence number 12 Art No 7
Sequence number 13 Art No 4
Sequence number 14 Art No 2
Sequence number 15 Art No 6

The top line in the withdrawal list represents the withdrawal order that is executed first according to the user's requirements. The withdrawal order consists of a sequence number and an associated article number. Thus, in the example described, the withdrawal list comprises fifteen withdrawal orders.

Consequently, sequence numbers 1 to 15 are each coupled to a desired article number. Starting with the position of the articles illustrated in FIG. 2, and with a given withdrawal list according to FIG. 3, the steps for performing the method are described below. The method comprises the following four main steps: marking, collection, arrival and sorting.

The method begins with step 1, wherein the control unit 10 searches for the first unmarked storage object 1 requested in the withdrawal order, and thus in the withdrawal list, and which lies at the top of one of the storage stacks 3 and/or in the arrival stack 2. It should be noted here that the control unit 10 detects the individual position of each storage object 1 in the store or warehouse. The starting position and step 1 are illustrated in FIG. 2.

Figure 3:
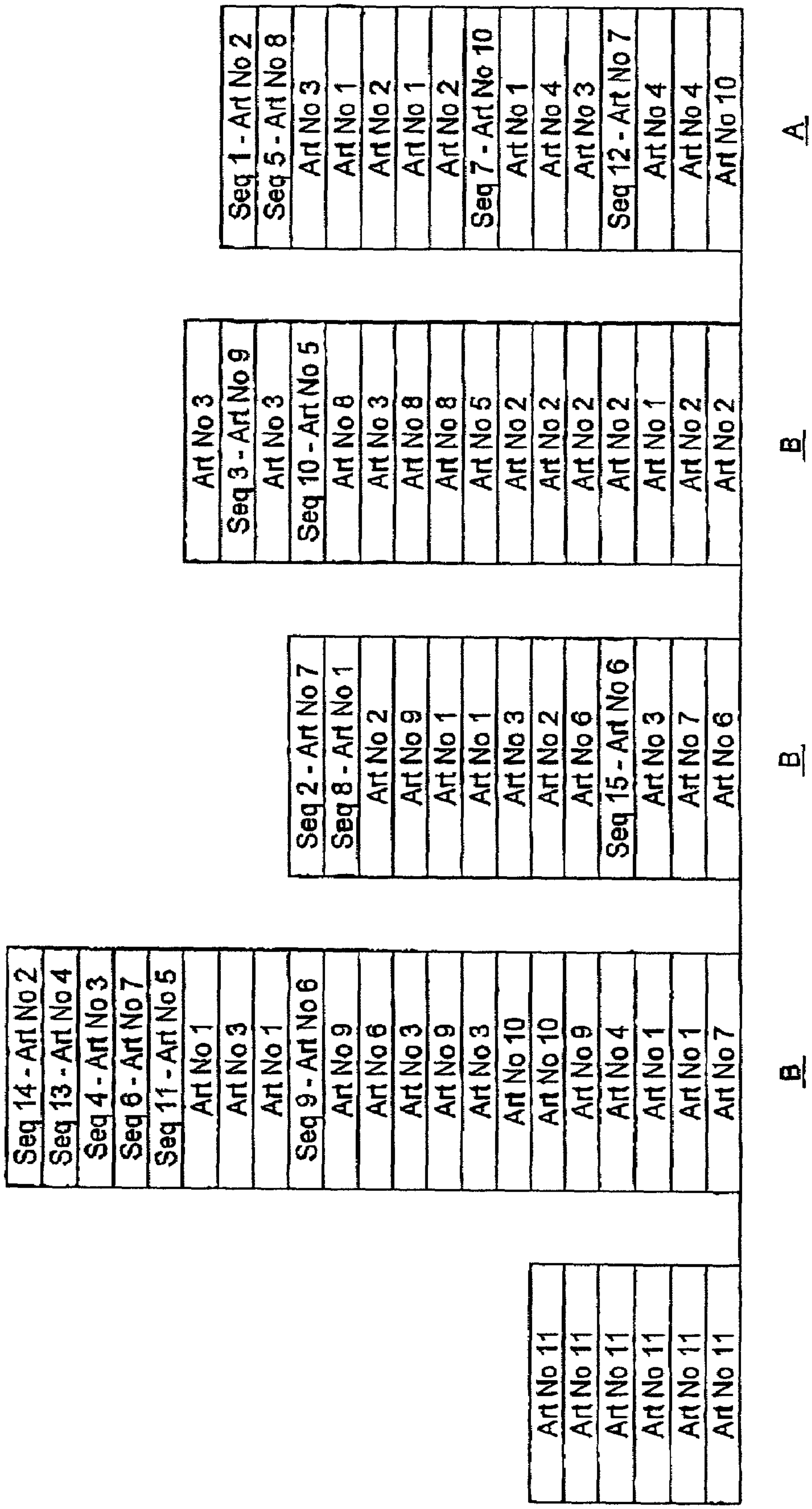
FIGS. 3–9 are illustrations of the successive transfer operations which are carried out according to the one embodiment of the present invention.

In step 2, shown in FIG. 3, the control unit 10, in an internal register, marks the storage object 1 searched in step 1 with a sequence number according to the withdrawal order.

In FIG. 3, the designation "sequence number" has been shortened to "seq" for illustration purposes due to limited space in the figures. Steps 1 and 2 are repeated as long as there are requested unmarked storage objects in the store or warehouse.

In step 3, the control unit 10 defines the storage stack which has the lowest positioned unmarked storage object 1 above a storage object marked in step 2, and assigns this storage stack 3 a first category (A) and assigns other storage stacks a second category (B). The division into stack categories is also illustrated in FIG. 3.

Figure 4:
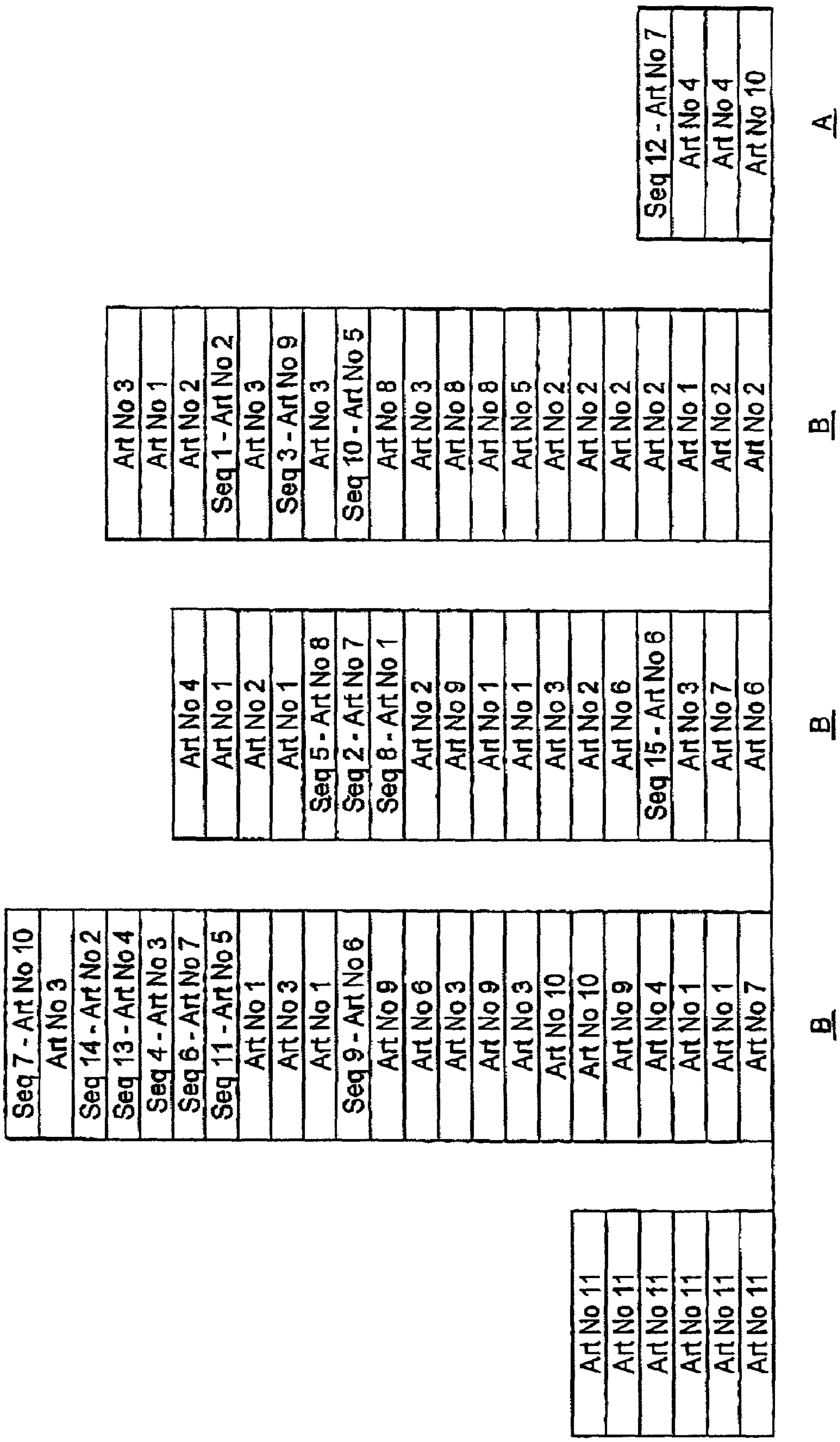

Referring to FIGS. 3 and 4, step 4 proceeds as follows: if in the storage stack 3 of the first category (A) there are one or more unmarked storage objects 1 above the lowest marked storage object 1, the collector 5 moves an unmarked or a marked storage object to a storage stack 3 of the said second category (B). Step 4 is repeated until no unmarked storage objects 1 lie above the said lowest marked storage object in the storage stack 1 of the first category (A).

Figure 5:
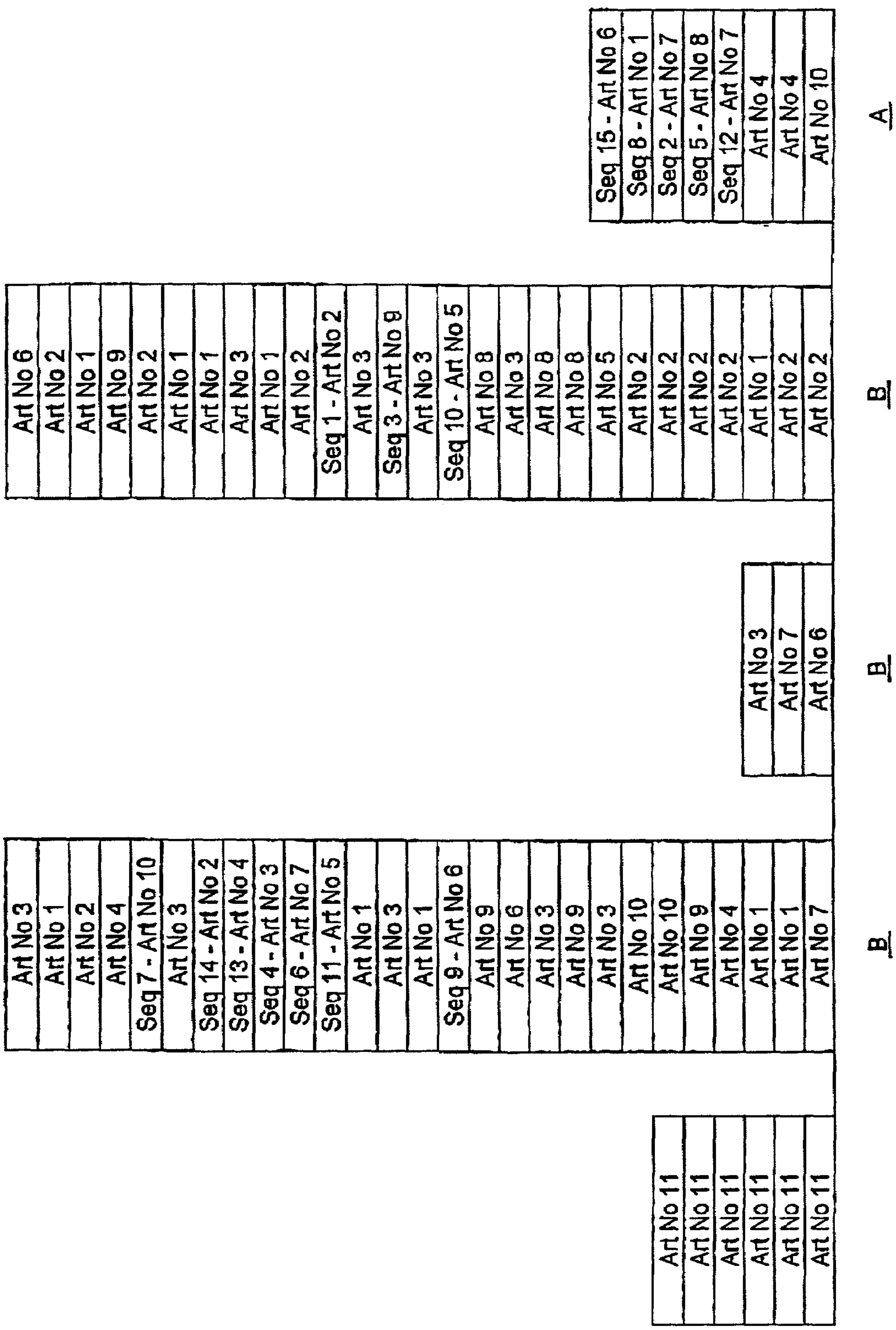

Thus, in FIG. 5, storage objects have been moved across from the storage stack of the first category (A) to other storage stacks of the second category (B) in such a way that no unmarked storage objects lie above the lowest marked storage object (in the example sequence number 12 with article number 7). The situation in FIG. 4 illustrates the store or warehouse when the first phase of collection has been completed.

Figure 6:
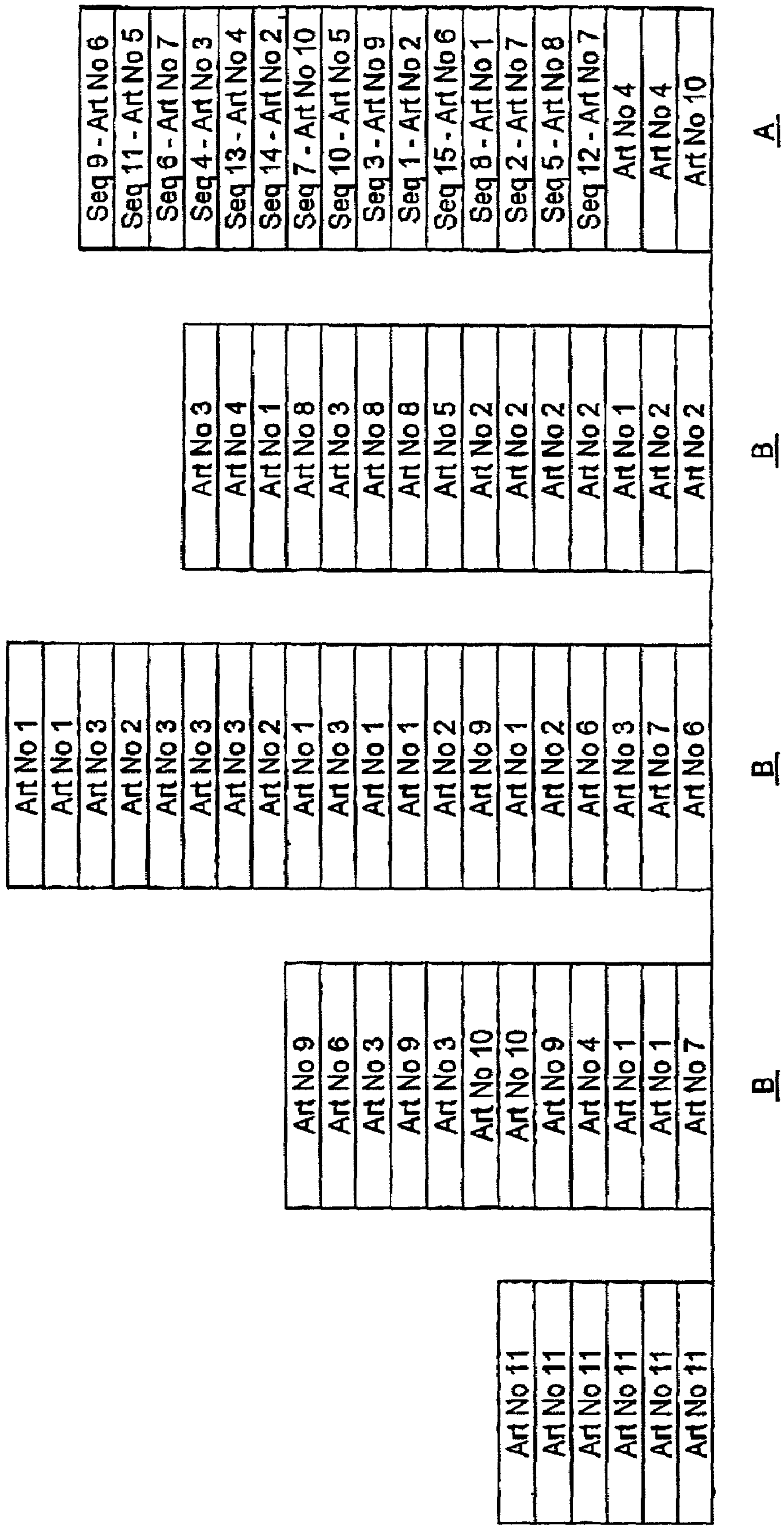

Referring to FIGS. 4, 5 and 6 in succession, the second phase of collection then proceeds as follows in step 5: if, in any storage stack 3 of the second category (B), there is a marked storage object 1, the collector moves—from the lowest storage stack of the said category (B) which contains a marked storage object—an unmarked storage object in this storage stack to a second storage stack of the same category (B), or a marked storage object to a storage stack of the said first category {A). FIG. 5 illustrates the situation when the second phase of collection has been carried out according to step 5. Step 5 is repeated until all the marked storage objects 1 are in the storage stack 3 of the first category (A). Collection is then completed, which is shown in FIG. 6.

Figure 7:
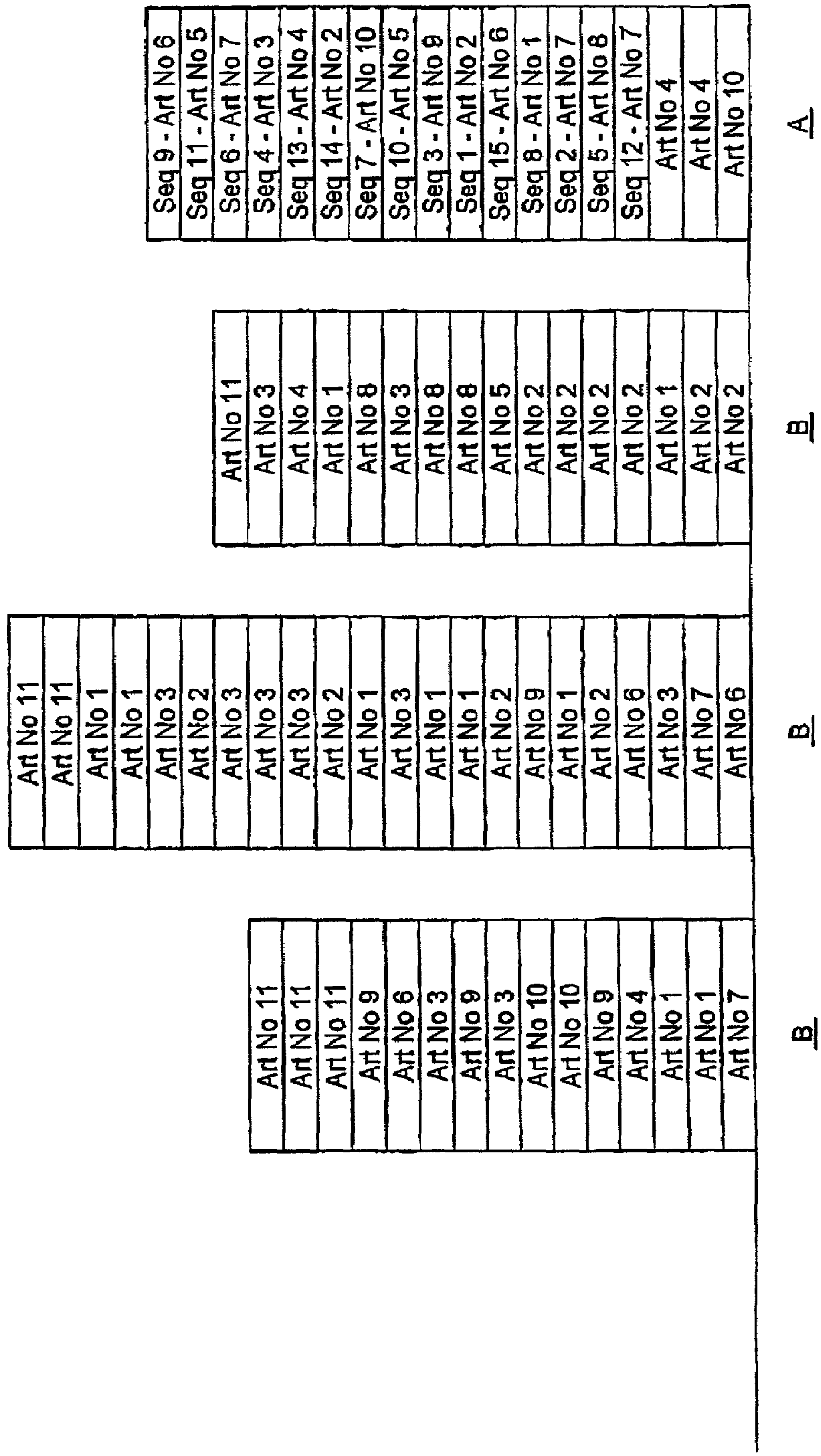

Referring to FIGS. 6 and 7, storage is carried out in step 6 by having the collector 5 moving the storage objects 1 lying in the arrival stack 2 to one or more storage stacks of the second category (B). Allocation to the respective stack or storage stack of the second category (B) can be done randomly. Step 6 is repeated until the arrival stack 2 is empty, which situation is illustrated in FIG. 7. The arrival stage is thus completed.

Figure 8:
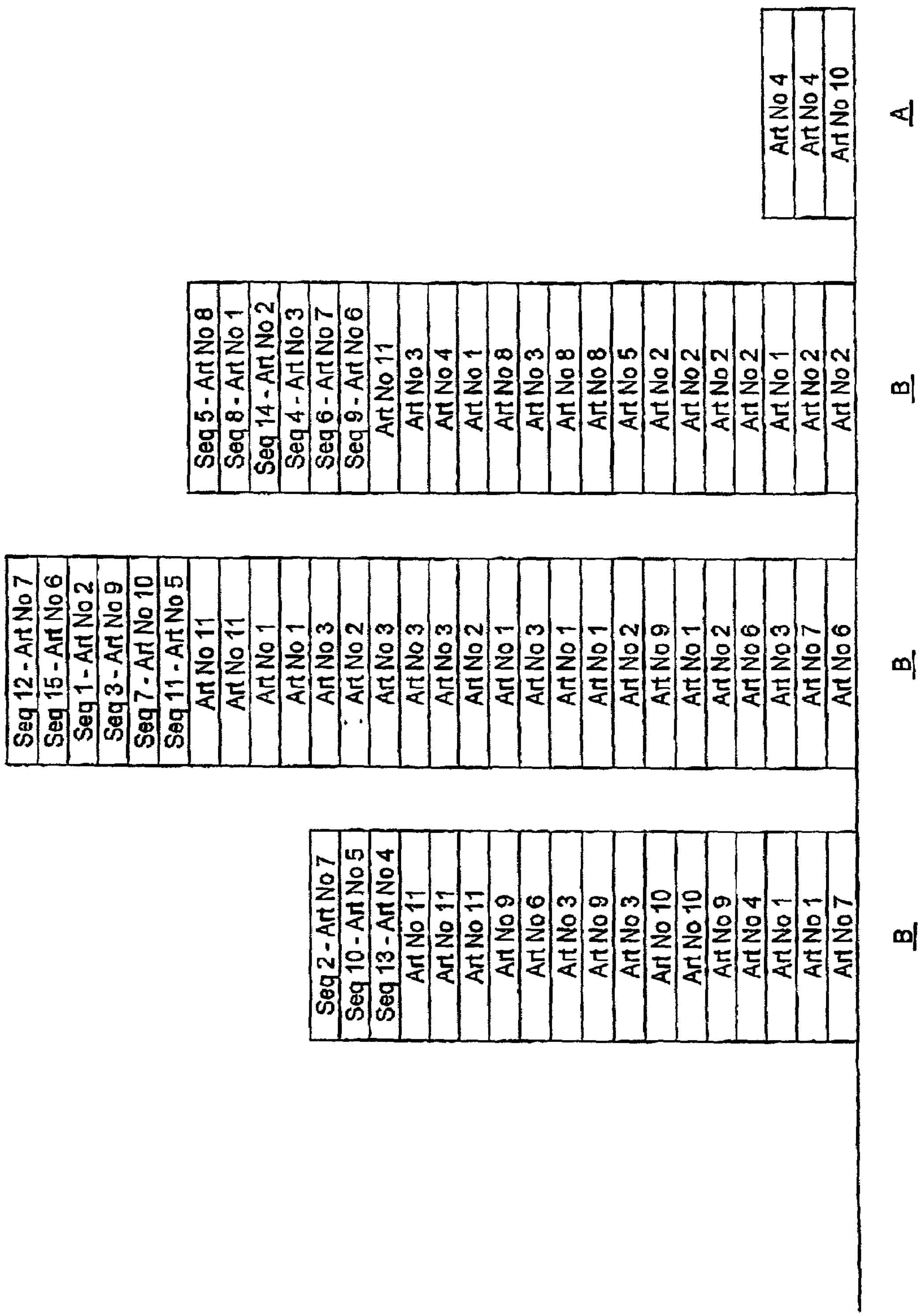

Referring to FIGS. 7 and 8, the sorting, now commences in step 7, where the collector 5 moves the uppermost marked storage object 1 from the storage stack of the first category (A) to a storage stack 3 of the second category (B) where a marked storage object, with the next higher sequence number in relation to the storage object which is moved, lies at the top.

In step 8, if the condition for moving according to step 7 is not satisfied, the collector moves the uppermost marked storage object 1 from the storage stack 3 of the first category (A) to a storage stack of the second category (B) that has no marked storage object 1.

In step 9, if the condition for moving according to step 8 is not satisfied, the collector 5 moves the uppermost marked storage object 1 from the storage stack 3 of the first category (A) to the storage stack 3 of the second category (B) whose uppermost marked storage object has the lowest sequence number in relation to the uppermost marked storage objects of the other storage stacks 3 of the same category (B).

Steps 7 to 9 are repeated until the storage stack 3 of the first category (A) has no marked storage objects. This situation is illustrated in FIG. 8.

In step 1, if all the marked storage objects lie in storage stacks of category (B), the sorting is completed for marked storage objects with a higher sequence number than their own sequence number or on an unmarked storage object 1; otherwise the sorting continues in accordance with step 11 below. In the example shown, we are now at FIG. 8. Since the condition according to step 10 still is not satisfied, the sorting continues according to step 11 described below.

In step 11, the collector 5 moves the storage object 1, to the storage stack 3 of the first category (A). This storage object 1 is among the uppermost marked storage objects in the storage stacks of the second category (B) and has a sequence number that is next higher than the sequence number of the storage object lying at the top of the storage stack 3 of the first category (A).

In step 12, if the condition for moving in accordance with step 11 is not satisfied, the collector 5 moves the storage object 1 back to the storage stack 3 of the first category (A). This storage object 1 has the lowest sequence ~umber among the uppermost marked storage objects in the storage stacks 3 of the second category (B).

Figure 9:
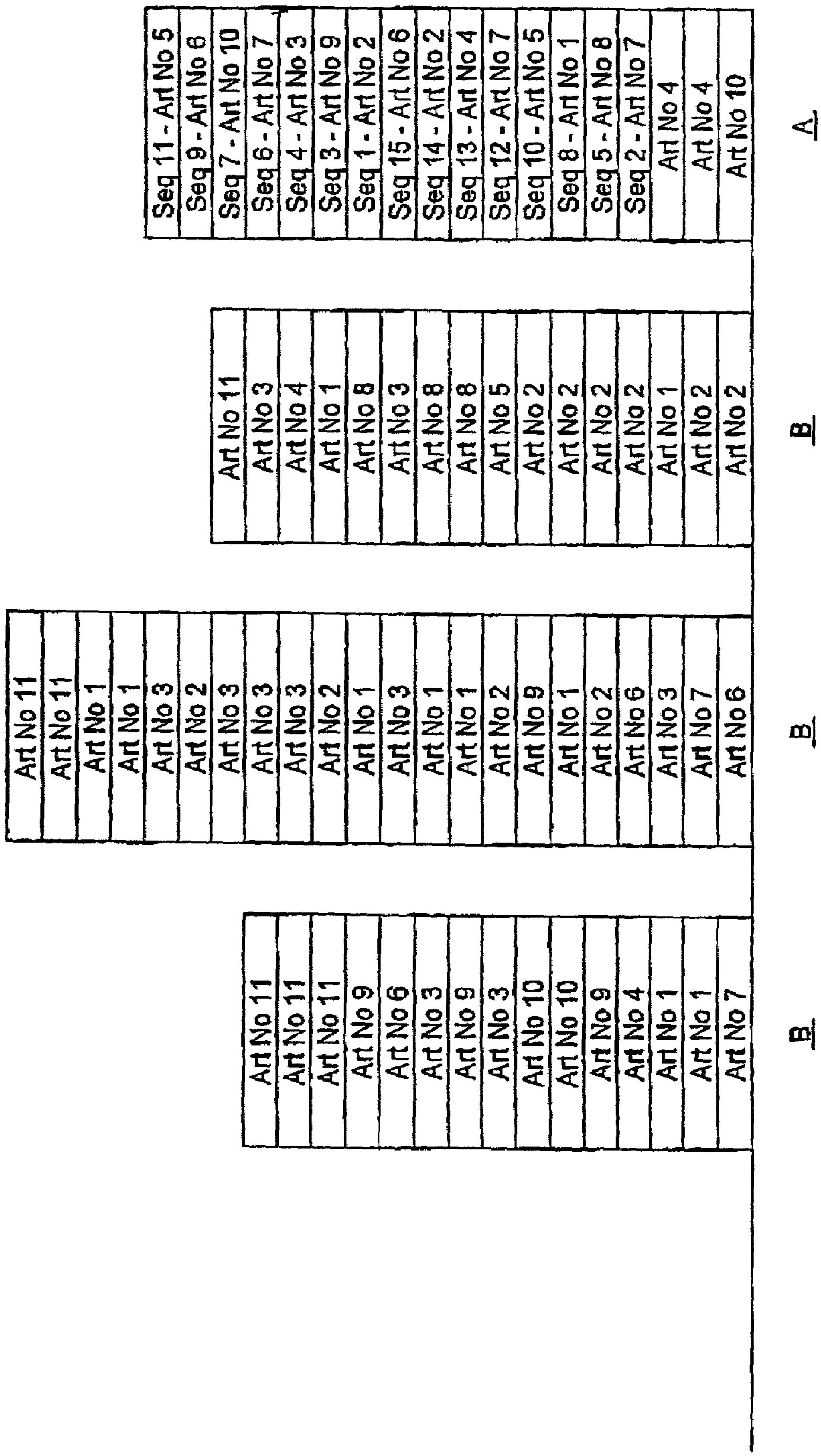
Figure 10:
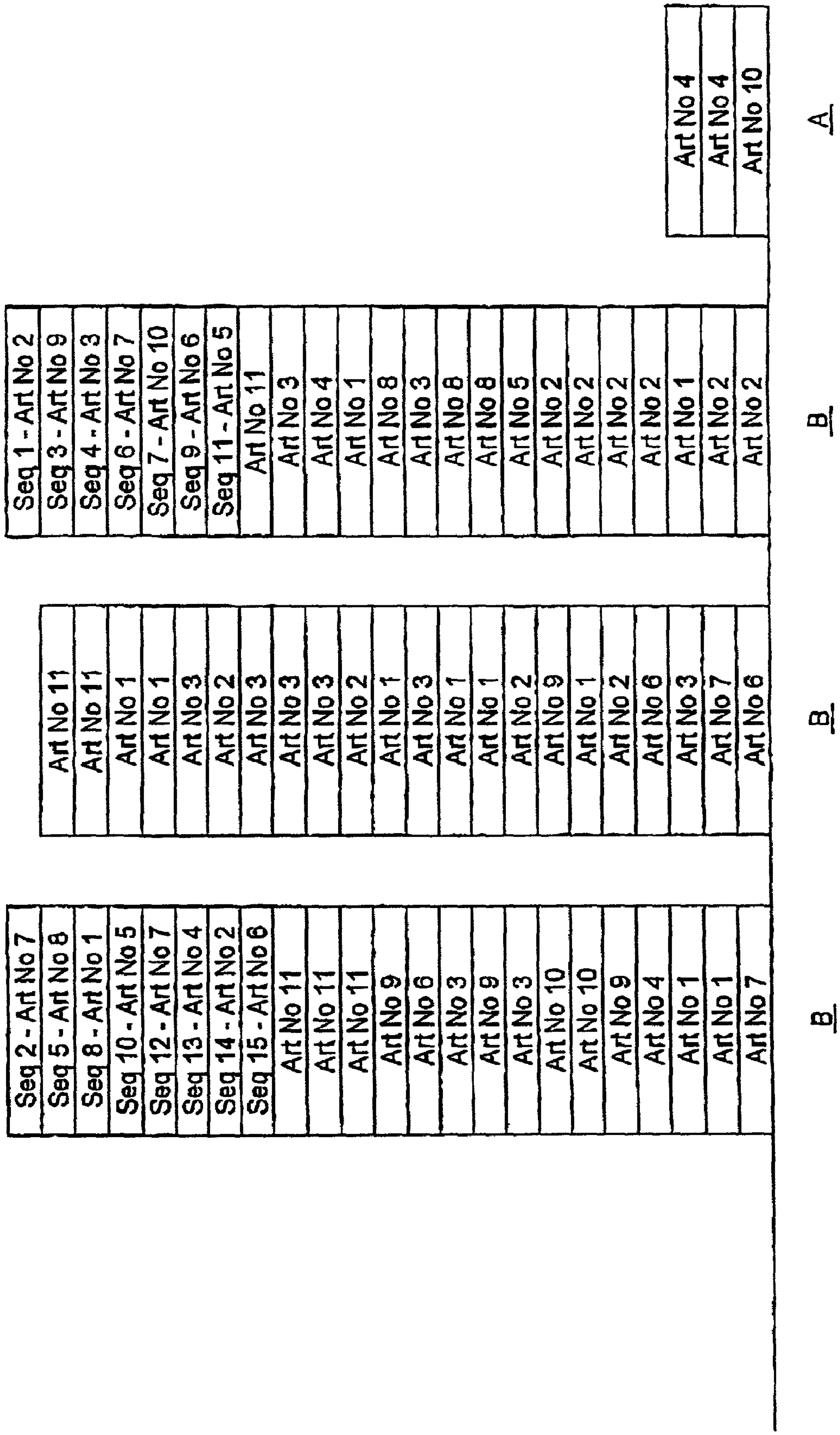
FIG. 10 is an illustration of the storage objects representing the final position upon completion of the handling method in accordance with one embodiment of the present invention.

Steps 11 and 12 are repeated until all the marked storage objects are lying in the storage stack of the first category (A). This situation is illustrated in FIG. 9.

In step 13, the sorting continues from step 7, i.e., the collector 5 moves the uppermost marked storage object 1 from the storage stack of the first category (A) to a storage stack of the second category (B) where a marked storage object 1, with the next higher sequence number in relation to the storage object which is moved, lies at the top. In the example shown, the sorting is now finished and the storage objects lie sorted in the storage stacks in such a way that the collector 5, at the time of delivery from the store, is able to pick up the storage objects in sequence according to the desired withdrawal list. In this example, the collector 5 thus first picks up the storage object with sequence number 1 and article number 2 from the storage stack of the second category (B) situated furthest to the right, after which the collector 5 picks up the storage object with sequence number 2 and article number 7 from the storage stack of the second category (B) situated furthest to the left. The collector then returns to the storage stack situated furthest to the left in order to deliver the storage object with sequence number 3 and article number 9. The delivery is then continued according to the same pattern until all the withdrawal orders in the withdrawal list have been executed. In the method according to the invention, it is therefore not necessary for all the storage objects present in the withdrawal list to be lying in one and the same storage stack at the end of sorting.

Figure 11:
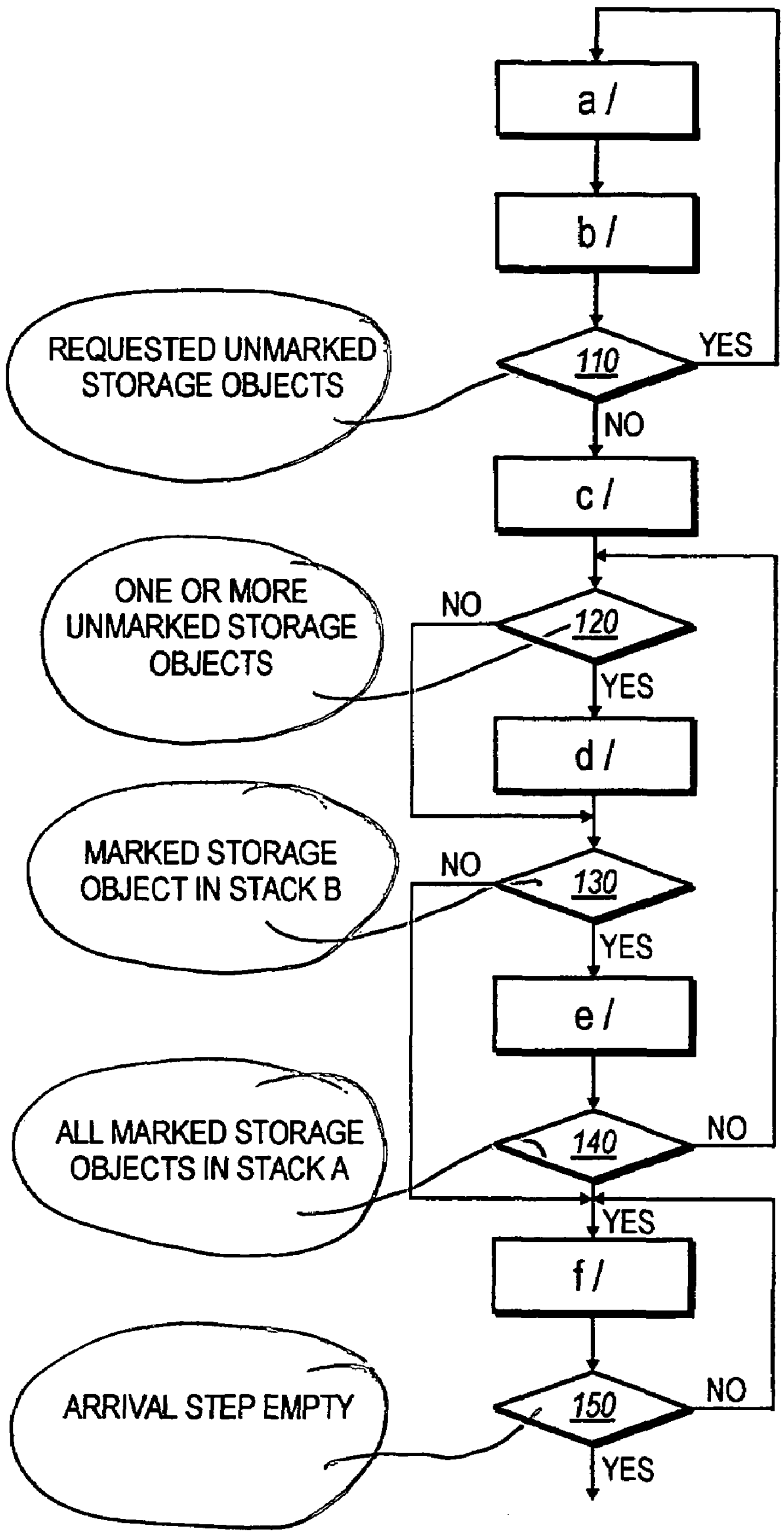
FIGS. 11–16 are illustrative flow chart diagrams of methods carried out in accordance with the present invention.
Figure 12:
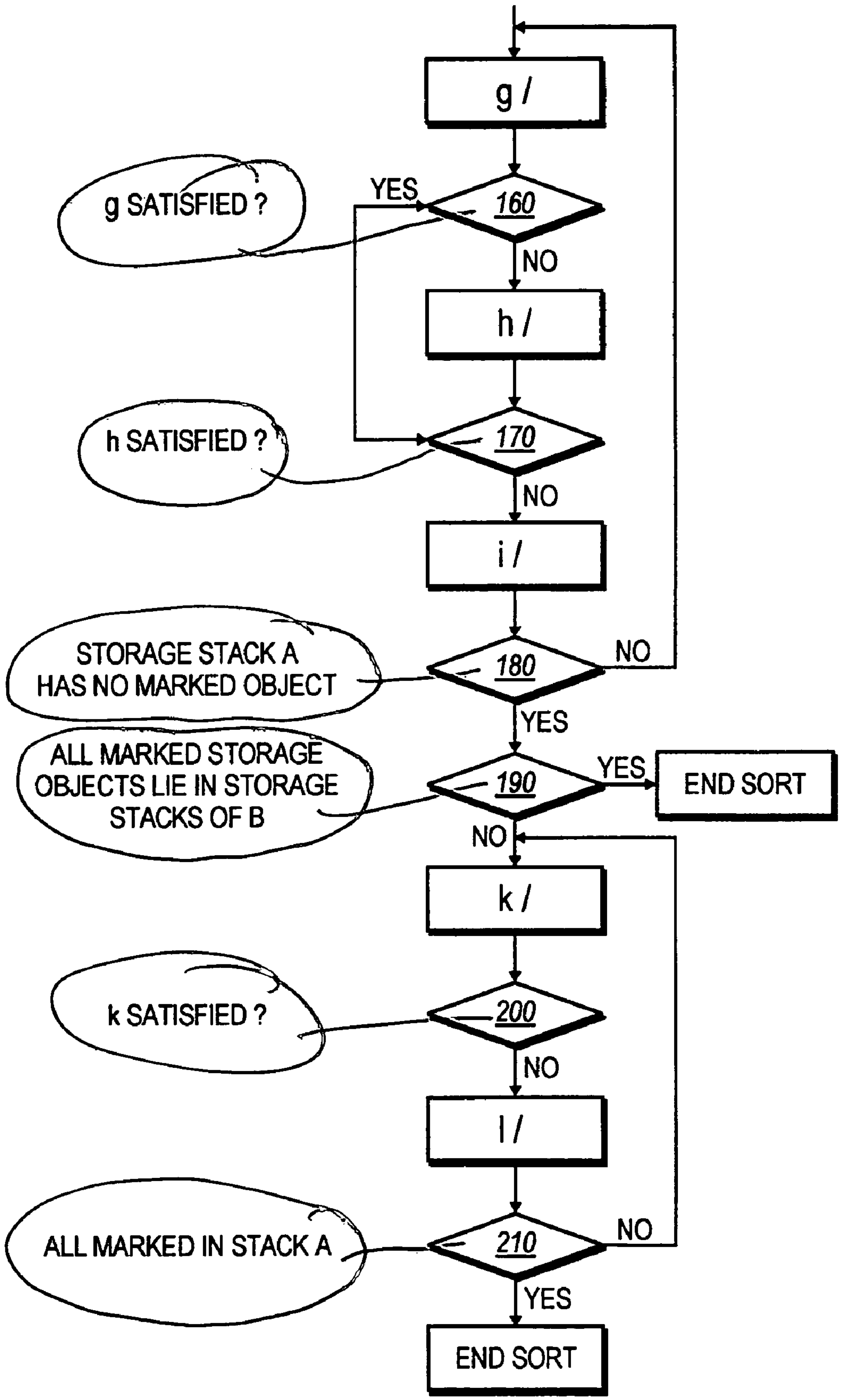

Illustrative embodiments of the present invention are presented in the decision flowcharts shown in FIGS. 11–16. With reference to FIG. 11, in step a the control unit searches for a first unmarked storage object which is requested in a withdrawal order lying next in a withdrawal list and which lies at the top of one of the storage stacks and/or the arrival stack. In step b an internal register is created in which the control unit marks the storage object found in step a with a sequence number according to the withdrawal order desired in the withdrawal sequence. Steps a and b are repeated as long as there are requested unmarked storage objects 110. If there are no requested unmarked storage objects, step c is carried out in which the control unit defines the storage stack which has the lowest unmarked storage object above a storage object marked in step b and assigns this storage stack a first category (A) and assigns other storage stacks a second category (B). If in the storage stack of the first category (A) there are one or more unmarked storage objects above the lowest marked storage object 120, the collector moves an unmarked or a marked storage object to a storage stack of the said second category (B). Step d is repeated until no unmarked storage objects lie above the lowest marked storage object in the storage stack of the first category (A). If there is a marked storage object in any storage stack of the second category (B), then 130 the collector moves from the lowest storage stack of the said category (B), which contains a marked storage object, an unmarked storage object in this storage stack to a second storage stack of the same category (B), or a marked storage object to a storage stack of the said first category (A) as part of step e. Step e is repeated 140 until all the marked storage objects are in the storage stack of the first category (A). In step f the collector moves storage objects lying in the arrival stack to one or more storage stacks of the second category (B). Step f is repeated 150 until the arrival stack is empty. With reference to FIG. 12 and continuing the above process, in step g the collector moves the uppermost marked storage object from the storage stack of the first category (A) to a storage stack of the second category (B) on which a marked storage object, with the next higher sequence number in relation to the storage object which is moved, lies at the top. If the condition for moving according to step g is not satisfied 160, then in step h the collector moves the uppermost marked storage object from the storage stack of the first category (A) to a storage stack of the second category (B) which has no marked storage object. If the condition for moving according to step h is not satisfied 170, then in step i the collector moves the uppermost marked storage object from the storage stack of the first category (A) to that storage stack of the second category (B) whose uppermost marked storage object has the lowest sequence number in relation to the uppermost marked storage objects of the other storage stacks of the same category (B). The above steps g–i are repeated until the storage stack of the first category (A) has no marked storage objects 180. If all the marked storage objects lie in storage stacks of the second category (B), on marked storage objects with a higher sequence number than their own sequence number or on an unmarked storage object, 190 the sorting is terminated, otherwise the sorting continues at step k. In step k the collector moves the storage object which, among the uppermost marked storage objects in the storage stacks of the second category (B) has a sequence number which is next higher than the sequence number of the storage object lying at the top of the storage stack of the first category (A), to the storage stack of the first category (A). If the condition for moving in accordance with step k is not satisfied 200, then in step l the collector moves the storage object which, among the uppermost marked storage objects in the storage stacks of the second category (B) has the lowest sequence number, back to the storage stack of the first category (A). Steps k and l are repeated 210 until all the marked storage objects are lying in the storage stack of the first category (A).

Figure 13:
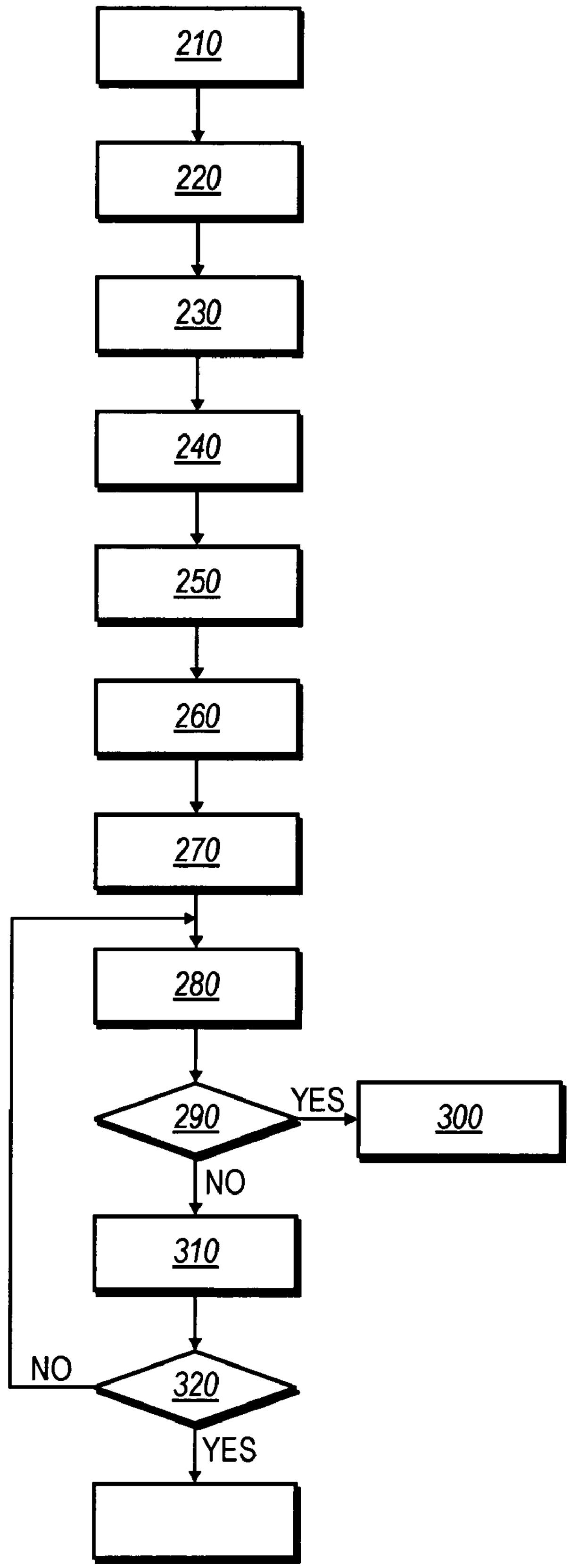
Figure 14:
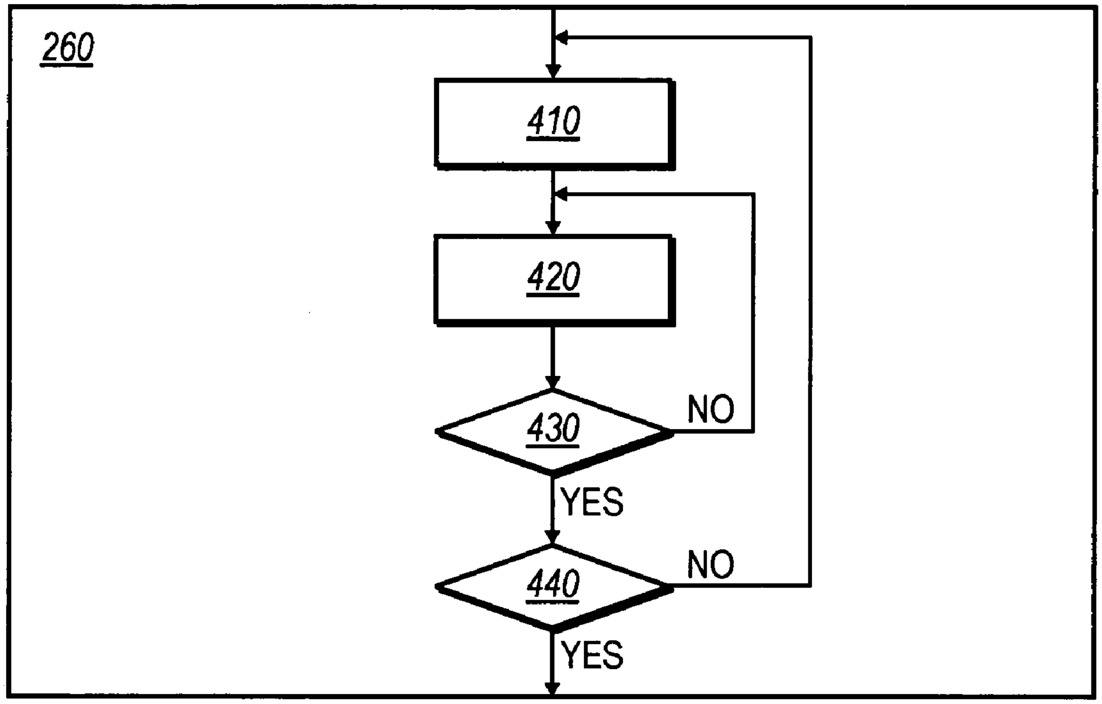
Figure 15:
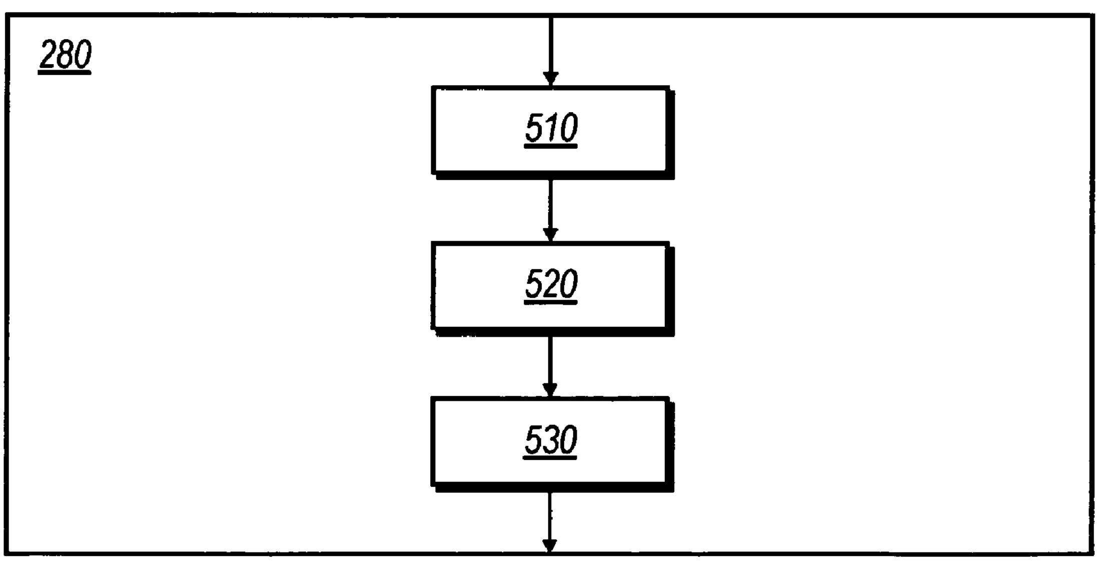
Figure 16:
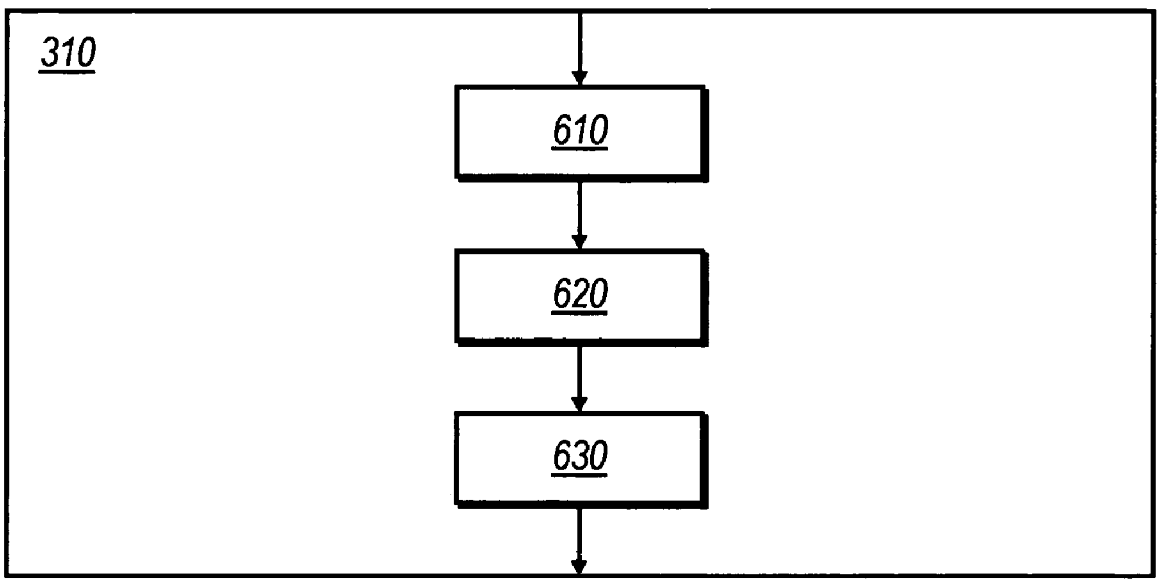

With reference to FIG. 13, shown is a flow chart for a method for sorting and stacking stackable storage objects in which the storage objects consist of at least three stacks. As shown, the method includes the steps of: 210 identifying and marking each storage object with a sequence number for each object in a withdrawal order; 220 identifying the lowest unmarked storage object above a mark storage object in each stack; 230 categorizing the stack containing the identified lowest unmarked storage object as a first stack; 240 categorizing each remaining stack as a second stack; 250 moving each storage object from the first stack onto one or more of the second stacks until the identified lowest unmarked storage object is removed from of the first stack; 260 sorting and moving all of the marked storage objects from the second stacks onto the first stack; 270 moving each of the storage objects in the arrival stack to one or more second stacks; 280 moving each of the marked storage objects to the second stacks from the first stack; 290 terminating the method 300 when each of the topmost marked storage objects in each of the second stacks has a lower sequential number than the marked storage object below the topmost marked storage object in a second stack; 310 rearranging the order of the marked storage objects in the first stack; and 320 repeating the steps of moving each of the marked storage objects to the second stacks from the first stack and rearranging the order of the marked storage objects in the first stack until each of the marked storage objects in each of the second stacks has a lower sequential number than the marked storage object below the marked storage object in a second stack. As illustrated in FIG. 14, the sorting and moving step 260 of FIG. 13 may further include the steps of: 410 selecting a second stack containing at least one marked storage object; 420 moving the storage object on top of the selected second stack to the first stack when the top storage object is a marked storage object and moving the top storage object to another second stack when the top storage object is an unmarked object until the all of the marked storage objects in the selected second stack are in the first stack 430; and continuing to select second stacks and move storage objects until all of the marked storage objects are in the first stack 440. As illustrated in FIG. 15, the step of moving each of the marked storage objects to the second stacks from the first stack 280 of FIG. 13, may further include the steps of: 510 moving the top marked storage object from the first stack to the second storage stack having the next highest sequence number with respect to the marked storage object being moved; 520 moving the top marked storage object from the first stack to the second storage second stack containing no marked storage objects when the storage object being moved has a higher sequence number than the sequential numbers of the marked storage objects on top of each of the second stacks; and 530 moving the top marked storage object from the first stack to the second storage stack containing the top marked storage object having the lowest sequential number of all of the top marked storage objects on the second stacks and each of the second stacks contains a marked storage object. As illustrated in FIG. 16, the step of rearranging the order of the marked storage objects in the first stack 310 of FIG. 13, may further include the steps of: 610 moving the top marked storage object from the first stack to the second stack having a marked storage object on top of the second stack having a marked storage object on top with the next highest sequential number compared to the sequential number of the top marked storage object on top of the first stack; 620 moving the top marked storage object from the first stack to one of the second stacks having an unmarked storage object on top when the sequential number of the marked storage object on top of the first stack is higher than the sequential number of the marked storage object on top of each second stack; and 630 moving the top marked storage object from the first stack to one of the second stacks having an unmarked storage object on top when all of the second stacks have unmarked storage objects on top.

Although the present invention has been described and illustrated in detail, it is to be clearly understood that the same is by way of illustration and example only, and is not to be taken as a limitation. The spirit and scope of the present invention are to be limited only by the terms on any claims presented hereafter.

What is claimed is:

1. A method for storage handling of stackable storage objects, where the storage objects are supplied in an arrival stack, the storage objects are stored in at least three storage stacks, the storage objects are moved between the said arrival stack and the storage stacks by means of a collector provided with means for securing and releasing the storage objects; control unit provided with a processor controls the movements of the collector via a communications link and in accordance with instructions from a user, which instructions are input to the control unit via a user interface coupled thereto, upon arrival of storage objects in said arrival stack, the control unit is fed with information on the individual identity of each storage object, its type and its position in the arrival stack, wherein said instructions include withdrawal orders which are arranged in a withdrawal list in the control unit in the desired sequence, each withdrawal order concerning a storage object of a certain type, the method comprising the steps of:

a) the control unit searches for the first unmarked storage object which is requested in the withdrawal order lying next in the withdrawal list and which lies at the top of one of the said storage stacks and/or the arrival stack;

b) in an internal register, the control unit marks the storage object found in step a with a sequence number according to the withdrawal order desired in the withdrawal sequence; repeating steps a and b as long as there are requested unmarked storage objects;

c) the control unit defines the storage stack which has the lowest unmarked storage object above a storage object marked in step b and assigns this storage stack a first category (A) and assigns other storage stacks a second category (B);

d) if in the storage stack of the first category (A) there are one or more unmarked storage objects above the lowest marked storage object, the collector moves an unmarked or a marked storage object to a storage stack of the said second category (B); repeating step d until no unmarked storage objects he above the said lowest marked storage object in the storage stack of the first category (A);

e) if, in any storage stack of the second category (B), there is a marked storage object, the collector moves from the lowest storage stack of the said category (B), which contains a marked storage object, an unmarked storage object in this storage stack to a second storage stack of the same category (B), or a marked storage object to a storage stack of the said first category (A); repeating step e until all the marked storage objects are in the storage stack of the first category (A);

f) the collector moves storage objects lying in the arrival stack to one or more storage stacks of the second category (B); repeating step f until the arrival stack is empty;

g) the collector moves the uppermost marked storage object from the storage stack of the first category (A) to a storage stack of the second category (B) on which a marked storage object, with the next higher sequence number in relation to the storage object which is moved, lies at the top;

h) if the condition for moving according to step g is not satisfied, the collector moves the uppermost marked storage object from the storage stack of the first category (A) to a storage stack of the second category (B) which has no marked storage object;

i) if the condition for moving according to step h is not satisfied, the collector moves the uppermost marked storage object from the storage stack of the first category (A) to that storage stack of the second category (B) whose uppermost marked storage object has the lowest sequence number in relation to the uppermost marked storage objects of the other storage stacks of the same category (B); repeating steps g–i until the storage stack of the first category (A) has no marked storage objects;

j) if all the marked storage objects lie in storage stacks of the second category (B), on marked storage objects with a higher sequence number than their own sequence number or on an unmarked storage object, the sorting is terminated, otherwise the sorting continues at step k;

k) the collector moves the storage object which, among the uppermost marked storage objects in the storage stacks of the second category (B) has a sequence number which is next higher than the sequence number of the storage object lying at the top of the storage stack of the first category (A), to the storage stack of the first category (A);

l) if the condition for moving in accordance with step k is not satisfied, the collector moves the storage object which, among the uppermost marked storage objects in the storage stacks of the second category (B) has the lowest sequence number, back to the storage stack of the first category (A); and repeating steps k and l until all the marked storage objects are lying in the storage stack of the first category (A).

2. A method for sorting and stacking stackable storage objects where the storage objects consist of at least three stacks, the method comprising the steps of:

identifying and marking each storage object with a sequence number for each object in a withdrawal order;

identifying the lowest unmarked storage object above a mark storage object in each stack;

categorizing the stack containing the identified lowest unmarked storage object as a first stack;

categorizing each remaining stack as a second stack;

moving each storage object from the first stack onto one or more of the second stacks until the identified lowest unmarked storage object is on top of the first stack;

sorting and moving all of the marked storage objects from the second stacks onto the first stack;

moving each of the storage objects in the arrival stack to one or more second stacks;

moving each of the marked storage objects to the second stacks from the first stack;

terminating the method when each of the marked storage objects in each of the second stacks has a lower sequential number than the marked storage object below the marked storage object in a second stack;

rearranging the order of the marked storage objects in the first stack; and repeating the steps of moving each of the marked storage objects to the second stacks from the first stack and rearranging the order of the marked storage objects in the first stack until each of the marked storage objects in each of the second stacks has a lower sequential number than the marked storage object below the marked storage object in a second stack, restacking of storage objects using sequence numbers if a storage object's number on the second stack is out of sequence with numbers in an adjacent stack.

3. A method for sorting and stacking stackable storage objects where the storage objects consist of at least three stacks, the method comprising the steps of:

identifying and marking each storage object with a sequence number for each object in a withdrawal order;

identifying the lowest unmarked storage object above a mark storage object in each stack;

categorizing the stack containing the identified lowest unmarked storage object as a first stack;

categorizing each remaining stack as a second stack;

moving each storage object from the first stack onto one or more of the second stacks until the identified lowest unmarked storage object is on top of the first stack;

sorting and moving all of the marked storage objects from the second stacks onto the first stack;

moving each of the storage objects in the arrival stack to one or more second stacks;

moving each of the marked storage objects to the second stacks from the first stack;

terminating the method when each of the marked storage objects in each of the second stacks has a lower sequential number than the marked storage object below the marked storage object in a second stack;

rearranging the order of the marked storage objects in the first stack; and repeating the steps of moving each of the marked storage objects to the second stacks from the first stack and rearranging the order of the marked storage objects in the first stack until each of the marked storage objects in each of the second stacks has a lower sequential number than the marked storage object below the marked storage object in a second stack;

selecting a second stack containing at least one marked storage object;

moving the storage object on top of the selected second stack to the first stack when the top storage object is a marked storage object and moving the top storage object to another second stack when the top storage object is an unmarked object until the all of the marked storage objects in the selected second stack are in the first stack; and continuing to select second stacks and move storage objects until all of the marked storage objects are in the first stack.

4. The method according to claim 3, wherein the selection of the second stacks containing at least one marked storage object is based on the height of the second stacks with the second stack containing the at least one marked storage object having the lowest height being selected.

5. The method according to claim 1, wherein the step of moving each of the marked storage objects to the second stacks from the first stack, further comprises the steps of:

moving the top marked storage object from the first stack to the second storage stack having the next highest sequence number with respect to the marked storage object being moved;

moving the top marked storage object from the first stack to the second storage second stack containing no marked storage objects when the storage object being moved has a higher sequence number than the sequential numbers of the marked storage objects on top of each of the second stacks; and moving the top marked storage object from the first stack to the second storage stack containing the top marked storage object having the lowest sequential number of all of the top marked storage objects on the second stacks and each of the second stacks contains a marked storage object.

6. A method for sorting and stacking stackable storage objects where the storage objects consist of at least three stacks, the method comprising the steps of:

identifying and marking each storage object with a sequence number for each object in a withdrawal order;

identifying the lowest unmarked storage object above a mark storage object in each stack;

categorizing the stack containing the identified lowest unmarked storage object as a first stack;

categorizing each remaining stack as a second stack;

moving each storage object from the first stack onto one or more of the second stacks until the identified lowest unmarked storage object is on top of the first stack;

sorting and moving all of the marked storage objects from the second stacks onto the first stack;

moving each of the storage objects in the arrival stack to one or more second stacks;

moving each of the marked storage objects to the second stacks from the first stack;

terminating the method when each of the marked storage objects in each of the second stacks has a lower sequential number than the marked storage object below the marked storage object in a second stack;

rearranging the order of the marked storage objects in the first stack; and repeating the steps of moving each of the marked storage objects to the second stacks from the first stack and rearranging the order of the marked storage objects in the first stack until each of the marked storage objects in each of the second stacks has a lower sequential number than the marked storage object below the marked storage object in a second stack;

moving the top marked storage object from the first stack to the second stack having a marked storage object on top of the second stack having a marked storage object on top with the next highest sequential number compared to the sequential number of the top marked storage object on top of the first stack;

moving the top marked storage object from the first stack to one of the second stacks having an unmarked storage object on top when the sequential number of the marked storage object on top of the first stack is higher than the sequential number of the marked storage object on top of each second stack; and moving the top marked storage object from the first stack to one of the second stacks having an unmarked storage object on top when all of the second stacks have unmarked storage objects on top.

* * * * *